(12) United States Patent
Lee et al.

(10) Patent No.: US 10,365,765 B2
(45) Date of Patent: Jul. 30, 2019

(54) ELECTRONIC DEVICE AND METHOD FOR PROCESSING TOUCH INPUT

(71) Applicant: SAMSUNG ELECTRONICS CO., LTD., Suwon-si, Gyeonggi-do (KR)

(72) Inventors: Sangwoo Lee, Suwon-si (KR); Donggyu Kim, Hwaseong-si (KR); Youngjoon Ko, Suwon-si (KR); Sangyup Lee, Gwangju-si (KR); Youngseok Lim, Suwon-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 15 days.

(21) Appl. No.: 15/266,113

(22) Filed: Sep. 15, 2016

(65) Prior Publication Data
US 2017/0083156 A1 Mar. 23, 2017

(30) Foreign Application Priority Data
Sep. 17, 2015 (KR) .......................... 10-2015-0131682

(51) Int. Cl.
| | |
|---|---|
| *G06F 3/041* | (2006.01) |
| *G06F 3/0485* | (2013.01) |
| *G06F 3/0486* | (2013.01) |
| *G06F 3/0488* | (2013.01) |

(52) U.S. Cl.
CPC .......... *G06F 3/0418* (2013.01); *G06F 3/0485* (2013.01); *G06F 3/0486* (2013.01); *G06F 3/04883* (2013.01)

(58) Field of Classification Search
CPC .... G06F 3/0418; G06F 3/0485; G06F 3/0486; G06F 3/04883
See application file for complete search history.

(56) References Cited

U.S. PATENT DOCUMENTS

2013/0082962 A1* 4/2013 Jo .......................... G06F 3/0416
345/173
2015/0355778 A1* 12/2015 Kim ..................... G06F 3/0416
345/173

FOREIGN PATENT DOCUMENTS

| KR | 10-2013-0035715 | 4/2013 |
| KR | 10-2013-0053264 | 5/2013 |
| KR | 10-2013-0077061 | 7/2013 |
| KR | 10-2014-0103777 | 8/2014 |

* cited by examiner

*Primary Examiner* — Insa Sadio
(74) *Attorney, Agent, or Firm* — Nixon & Vanderhye P.C.

(57) ABSTRACT

A method for processing a touch or a gesture input made though the touch panel of the electronic device is provided. An electronic device includes a display having a touch panel for receiving a touch or a gesture input, a processor which is electrically connected to the display, and a memory which is electrically connected to the processor, wherein the memory stores instructions, executable to configure the processor to receive the gesture input made through the touch panel, to detect touch coordinates corresponding to the gesture input on the touch panel, to determine predictive coordinates corresponding to the touch coordinates, to determine whether to compensate the predictive coordinates based on a movement direction of the gesture input, to determine target coordinates corresponding to the predictive coordinates based on a movement speed of the gesture input, and to display at least one object at the target coordinates on the display.

16 Claims, 11 Drawing Sheets

ELECTRONIC DEVICE AND METHOD FOR PROCESSING TOUCH INPUT

CROSS-REFERENCE TO RELATED APPLICATION(S)

This application is based on and claims priority under 35 U.S.C. § 119 to a Korean patent application filed on Sep. 17, 2015 in the Korean intellectual property office and assigned serial number 10-2015-0131682, the disclosure of which is incorporated by reference herein in its entirety.

TECHNICAL FIELD

The disclosure relates to an electronic device equipped with a touch panel and, for example, to a method for processing a touch or a gesture input made though the touch panel of the electronic device.

BACKGROUND

An electronic device equipped with a touch panel may detect a user's gesture input made on the touch panel by means of a finger or a touch pen and execute a command corresponding to the gesture input. In this case, there can be two types of delays: the delay for a sensor of the touch panel to detect the touch or gesture input; and the delay for the touch panel to process the touch or gesture input in a software manner and display the processing result on the screen. In order to reduce the amount of time between the gesture input and the screen display, the electronic device may calculate the predictive coordinates on the display screen based on the coordinates at which the gesture input is made. The electronic device may change the display screen in accordance with the calculated predictive coordinates.

In the case of calculating the predictive coordinates of the contact points of the gesture inputs consistently without consideration of the direction of the seamless touch input, it is difficult to compensate for any overshoot between the real coordinates and the predictive coordinates, especially when the direction of successive inputs is changed. This is likely to give the user an unsatisfactory close contact feeling.

In the case of performing noise canceling on the predictive coordinates without consideration of the movement speed of the seamless touch input, there may be deterioration in the unsatisfactory close contact feeling because of repetitive noise canceling processes.

SUMMARY

The disclosure addresses the above problems and aims to provide an apparatus and method for providing the user with best close contact feeling by determining the predictive coordinates based on the movement direction and speed of the touch input gesture.

In accordance with an aspect of an example embodiment, an electronic device is provided. The electronic device includes: a display having a touch panel for receiving a touch or a gesture input, a processor which is electrically connected to the display, and a memory which is electrically connected to the processor, wherein the memory stores instructions, executable by the processor to configure to processor to receive the gesture input made through the touch panel, to detect touch coordinates corresponding to the gesture input on the touch panel, to determine predictive coordinates corresponding to the touch coordinates, to determine whether to compensate the predictive coordinates based on a movement direction of the gesture input, to determine target coordinates corresponding to the predictive coordinates based on a movement speed of the gesture input, and to display at least one object at the target coordinates on the display.

In accordance with another example embodiment, a touch input processing method of an electronic device is provided. The touch input processing method includes: receiving the gesture input made through the touch panel, detecting touch coordinates corresponding to the gesture input on the touch panel, determining predictive coordinates corresponding to the touch coordinates, determining whether to compensate the predictive coordinates based on a movement direction of the gesture input, determining target coordinates corresponding to the predictive coordinates based on the movement speed of the gesture input, and displaying at least one object at the target coordinates on the display.

BRIEF DESCRIPTION OF THE DRAWINGS

The above and other aspects of the example embodiments will become more apparent from the following detailed description, taken in conjunction with the drawings, in which like reference numerals refer to like elements, and wherein.

DETAILED DESCRIPTION

Figure 1:
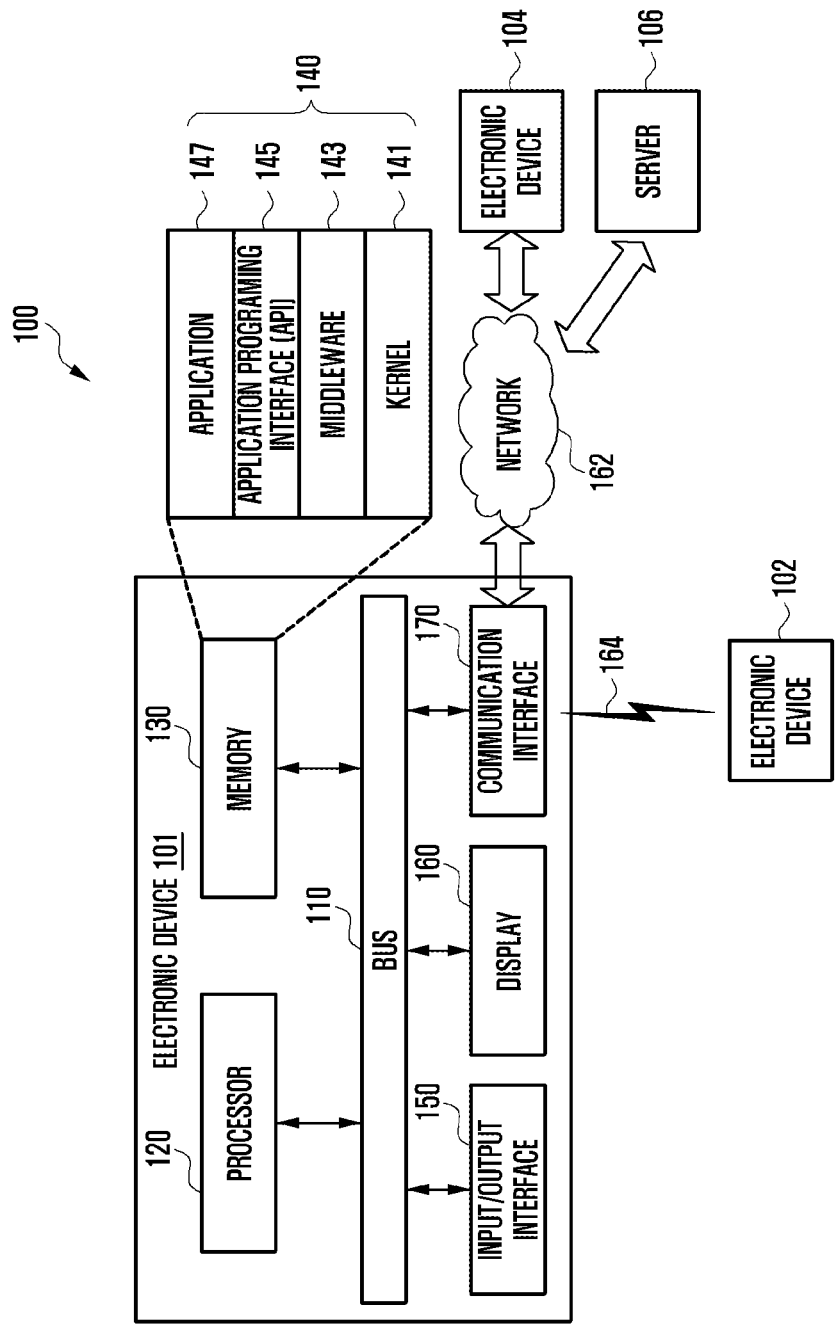
FIG. 1 is a block diagram illustrating an example network environment including electronic devices according to an example embodiment.

The following description with reference to the accompanying drawings is provided to assist in a comprehensive understanding of various example embodiments of the present disclosure. It includes various details to assist in that understanding but these are to be regarded as merely examples. Accordingly, those of ordinary skill in the art will recognize that various changes and modifications of the various example embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used to enable a clear and consistent understanding of the present disclosure. Accordingly, it should be apparent to those skilled in the art that the following description of various example embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly indicates otherwise. Thus, for example, reference to "a component surface" includes reference to one or more of such surfaces.

In this disclosure, the expression "A or B" or "at least one of A and/or B" may include A, may include B, or may include both A and B. Expressions including ordinal numbers, such as "first" and "second," etc., may modify various elements. However, the above expressions do not limit the sequence and/or importance of the elements and are used merely for the purpose to distinguish an element from the other elements. In case where a certain (e.g., the first) element is referred to as being "connected" or "accessed" (functionally or communicatively) to other (e.g., the second) element, it should be understood that the element is connected or accessed directly to the other element or through another (e.g., the third) element. In this disclosure, the expression "configured to" may be used, depending on situations, interchangeably with "adapted to", "having the ability to", "modified to", "made to", "capable of", or "designed to". In some situations, the expression "device configured to" may mean that the device may operate with other device(s) or other component(s). For example, the expression "processor configured to perform A, B and C" may mean a dedicated processor (e.g., an embedded processor) for performing the above operations, or a general-purpose processor (e.g., central processing unit (CPU) or an application processor (AP)) capable of performing the above operations by executing one or more software programs stored in a memory device. An electronic device according to various embodiments of this disclosure may include at least one of a smart phone, a tablet personal computer (PC), a mobile phone, a video phone, an e-book reader, a desktop PC, a laptop PC, a netbook computer, a workstation, a server, a personal digital assistant (PDA), a portable multimedia player (PMP), a Moving Picture Experts Group phase 1 or phase 2 (MPEG-1 or MPEG-2) audio layer 3 (MP3) player, a medical device, a camera, and a wearable device, or the like. For example, a wearable device may include at least one of an accessory type (e.g., a watch, a ring, a bracelet, an anklet, a necklace, an electronic accessory, eyeglasses, contact lenses, or a head-mounted device (HMD)), a textile or cloth assembled type (e.g., electronic clothing), a body attached type (e.g., a skin pad or tattoo), and a body transplant circuit. In some embodiments, an electronic device may include at least one of a television (TV), a digital versatile disc (DVD) player, an audio device, a refrigerator, an air-conditioner, a vacuum cleaner, an oven, a microwave, a washing machine, an air cleaner, a set-top box, a home automation control panel, a security control panel, a media box (e.g., Samsung HomeSync™, Apple TV™, or Google TV™), a game console (e.g., Xbox™, PlayStation™), an electronic dictionary, an electronic key, a camcorder, and an electronic frame, or the like.

In various embodiments of the present disclosure, an electronic device may include at least one of various medical devices (e.g., magnetic resonance angiography (MRA), magnetic resonance imaging (MRI), computed tomography (CT), a scanning machine, an ultrasonic wave device, etc.), a navigation device, a global navigation satellite system (GNSS), an event data recorder (EDR), a flight data recorder (FDR), a vehicle infotainment device, an electronic equipment for a ship (e.g., navigation equipment for a ship, gyrocompass, etc.), avionics, a security device, a head unit or device for a vehicle, an industrial or home robot, a drone, an automated teller machine (ATM), a point of sales (POS), and various Internet of things (IoT) devices (e.g., a lamp, various sensors, a sprinkler, a fire alarm, a thermostat, a street light, a toaster, athletic equipment, a hot water tank, a heater, a boiler, etc.), or the like. According to an example embodiment, an electronic device may include at least one of furniture, a portion of a building/structure or car, an electronic board, an electronic signature receiving device, a projector, and various measuring meters (e.g., a water meter, an electric meter, a gas meter, a wave meter, etc.), or the like. In various example embodiments, an electronic device may be flexible or a combination of two or more of the aforementioned devices. An electronic device according to various embodiments of this disclosure is not limited to the aforementioned devices. In this disclosure, the term a user may refer to a person who uses an electronic device, or a machine (e.g., an artificial intelligence device) which uses an electronic device.

FIG. 1 is a block diagram illustrating an example network environment 100 including therein an electronic device 101 in accordance with various example embodiments of the present disclosure.

Referring to FIG. 1, the electronic device 101 may include, but is not limited to, a bus 110, a processor 120, a memory 130, an input/output interface 150, a display 160, and a communication interface 170. The bus 110 may be a circuit designed for connecting the above-discussed elements and communicating data (e.g., a control message) between such elements. The processor 120 may receive commands from the other elements (e.g., the memory 130, the input/output interface 150, the display 160, or the communication interface 170, etc.) through the bus 110, interpret the received commands, and perform the arithmetic or data processing based on the interpreted commands. The memory 130 may store therein commands or data received from or created at the processor 120 or other elements (e.g., the input/output interface 150, the display 160, or the communication interface 170, etc.). The memory 130 may include programming modules 140 such as a kernel 141, a middleware 143, an application programming interface (API) 145, and an application 147. Each of the programming modules may be composed of software, firmware, hardware, and any combination thereof.

The kernel 141, as illustrated in FIG. 1, may control or manage system resources (e.g., the bus 110, the processor 120, the memory 130, etc.) used to execute operations or functions implemented by other programming modules (e.g., the middleware 143, the API 145, and the application 147). Also, the kernel 141 may provide an interface capable of accessing and controlling or managing the individual elements of the electronic device 101 by using the middleware 143, the API 145, or the application 147.

The middleware 143 may serve to go between the API 145 or the application 147 and the kernel 141 in such a manner that the API 145 or the application 147 communicates with the kernel 141 and exchanges data therewith. Also, in relation to work requests received from one or more applications 147 and/or the middleware 143, for example, may perform load balancing of the work requests by using a method of assigning a priority, in which system resources (e.g., the bus 110, the processor 120, the memory 130, etc.) of the electronic device 101 can be used, to at least one of the one or more applications 147. The API 145 is an interface through which the application 147 is capable of controlling a function provided by the kernel 141 or the middleware 143, and may include, for example, at least one interface or function for file control, window control, image processing, character control, or the like. The input/output interface 150 may deliver commands or data, entered by a user through an input/output unit or device (e.g., a sensor, a keyboard, or a touch screen), to the processor 120, the memory 130, or the communication interface 170 via the bus 110.

The display module 160 may include, for example, a liquid crystal display (LCD), a light emitting diode (LED) display, an organic LED (OLED) display, a micro electro mechanical system (MEMS) display, or an electronic paper display, or the like. The display 160 may display various types of contents (e.g., text, images, videos, icons, or symbols) for users. The display module 160 may include a touch screen, and may receive, for example, a touch, gesture, proximity, or hovering input by using an electronic device or a part of the user's body.

The communication interface 170 may establish communication between the electronic device 101 and any external device (e.g., the first external electronic device 102, the second external electronic device 104, or the server 106) using various communication circuitry. For example, the communication interface 170 may be connected with a network 162 through wired or wireless communication 164 and thereby communicate with any external device (e.g., the second external electronic device 104, or the server 106).

Wireless communication may use, as cellular communication protocol, at least one of long-term evolution (LTE), LTE advanced (LTE-A), code division multiple access (CDMA), wideband CDMA (WCDMA), universal mobile telecommunications system (UMTS), wireless broadband (WiBro), global system for mobile communications (GSM), and the like, for example. A short-range communication may include, for example, at least one of Wi-Fi, Bluetooth (BT), near field communication (NFC), magnetic secure transmission or near field magnetic data stripe transmission (MST), and GNSS, and the like. The GNSS may include at least one of, for example, a global positioning system (GPS), a global navigation satellite system (GLONASS), a BeiDou navigation satellite system (hereinafter, referred to as "BeiDou"), and Galileo (European global satellite-based navigation system). Hereinafter, the "GPS" may be interchangeably used with the "GNSS" in the present disclosure.

The wired communication may include, but not limited to, at least one of universal serial bus (USB), high definition multimedia interface (HDMI), recommended standard 232 (RS-232), or plain old telephone service (POTS). The network 162 includes, as a telecommunications network at least one of a computer network (e.g., local area network (LAN) or wide area network (WAN)), the internet, and a telephone network. The types of the first and second external electronic devices 102 and 104 may be the same as or different from the type of the electronic device 101. The server 106 may include a group of one or more servers. A portion or all of operations performed in the electronic device 101 may be performed in one or more other electronic devices 102 or 104 or the server 106. In the case where the electronic device 101 performs a certain function or service automatically or in response to a request, the electronic device 101 may request at least a portion of functions related to the function or service from another electronic device 102 or 104 or the server 106 instead of or in addition to performing the function or service for itself. The other electronic device 102 or 104 or the server 106 may perform the requested function or additional function, and may transfer a result of the performance to the electronic device 101. The electronic device 101 may additionally process the received result to provide the requested function or service. To this end, for example, a cloud computing technology, a distributed computing technology, or a client-server computing technology may be used.

Figure 2:
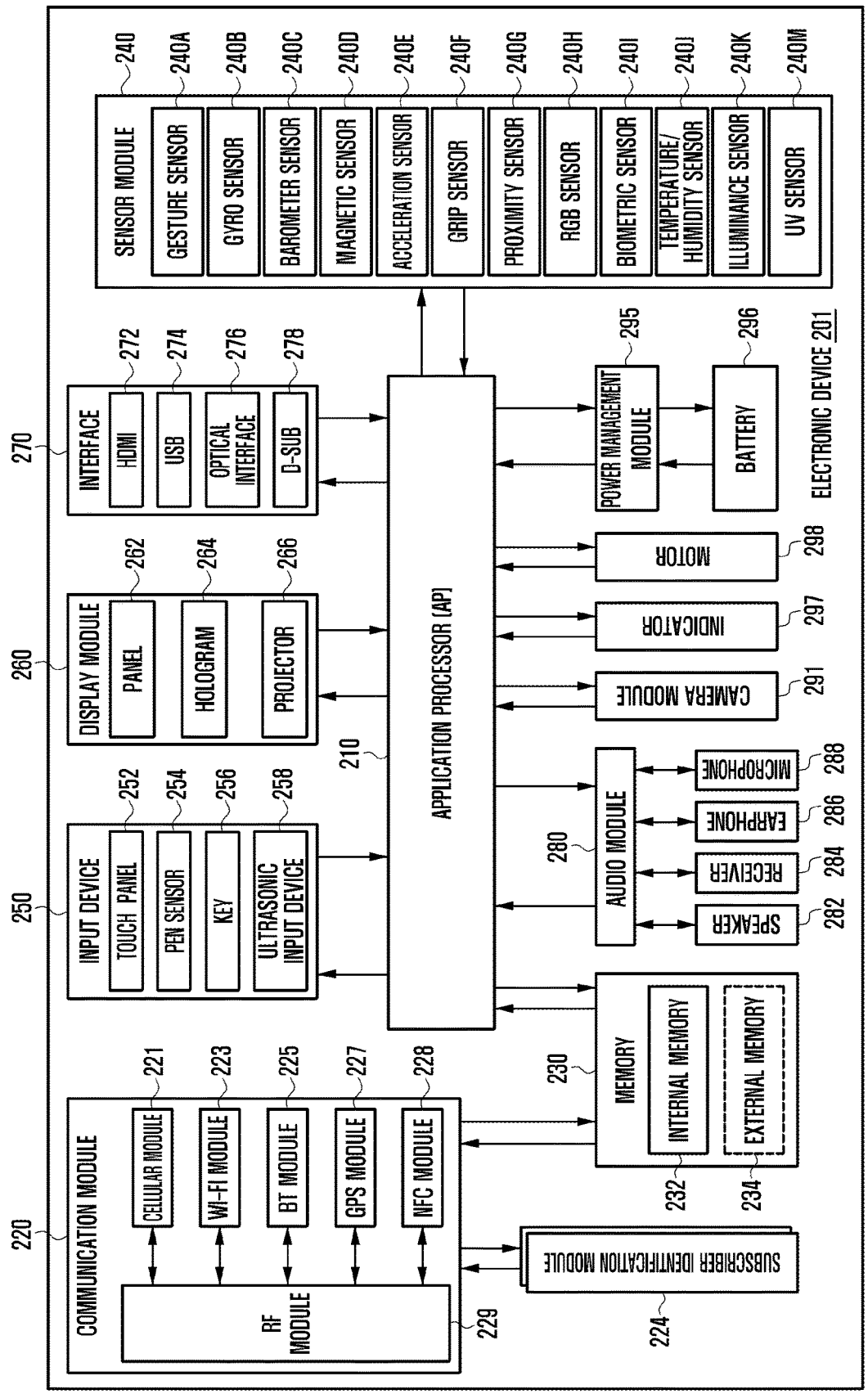
FIG. 2 is a block diagram illustrating an example configuration of the electronic device according to various example embodiments.

FIG. 2 is a block diagram illustrating an example electronic device 201 according to various example embodiments of the present disclosure. The electronic device 201 may form, for example, the whole or part of the electronic device 101 shown in FIG. 1.

Referring to FIG. 2, the electronic device 201 may include at least one AP 210, a communication module (e.g., including communication circuitry) 220, a subscriber identification module (SIM) card 224, a memory 230, a sensor module (e.g., including various sensors) 240, an input unit or input device (e.g., including input circuitry) 250, a display or display module 260, an interface (e.g., including interface circuitry) 270, an audio module 280, a camera module 291, a power management module 295, a battery 296, an indicator 297, and a motor 298. The processor 210 is capable of driving, for example, an operating system or an application program to control a plurality of hardware or software components connected to the processor 210, processing various data, and performing operations. The processor 210 may be implemented as, for example, a system on chip (SoC). According to an example embodiment, the processor 210 may further include a graphics processing unit (GPU) and/or an image signal processor.

The processor 210 may also include at least part of the components shown in FIG. 2, e.g., a cellular module 221. The processor 210 is capable of loading commands or data received from at least one of other components (e.g., a non-volatile memory) on a volatile memory, processing the loaded commands or data. The processor 210 is capable of storing various data in a non-volatile memory. The communication module 220 (e.g., the communication interface 170) may include various communication circuitry configured to perform a data communication with any other electronic device (e.g., the electronic device 104 or the server 106) connected to the electronic device 201 (e.g., the electronic device 101) through the network. According to an embodiment, the communication module 220 may include therein a cellular module 221, a Wi-Fi module 223, a BT module 225, a GNSS or GPS module 227, an NFC module 228, and a radio frequency (RF) module 229. The cellular module 221 is capable of providing a voice call, a video call, a short message service (SMS), an internet service, etc., through a communication network, for example. According to an embodiment, the cellular module 221 is capable of identifying and authenticating an electronic device 201 in a communication network by using a SIM 224 (e.g., a SIM card). According to an embodiment, the cellular module 221 is capable of performing at least part of the functions provided by the processor 210. According to an embodiment, the cellular module 221 is also capable of including a communication processor (CP).

As illustrated in FIG. 2, the Wi-Fi module 223, the BT module 225, the GNSS module 227, and the NFC module 228 are each capable of including a processor for processing data transmitted or received through the corresponding module.

The NFC module 228 is capable of including a processor for processing data transmitted or received through the corresponding module. According to various embodiments, at least part of the cellular module 221, Wi-Fi module 223, BT module 225, GNSS module 227, NFC module 228, and NFC module (e.g., two or more modules) may be included in one integrated chip (IC) or one IC package. The RF module 229 is capable of transmission/reception of communication signals, e.g., RF signals. The RF module 229 is capable of including a transceiver, a power amp module (PAM), a frequency filter, a low noise amplifier (LNA), an antenna, etc. According to an embodiment, at least one of the cellular module 221, the Wi-Fi module 223, the BT module 225, the GNSS module 227, and the NFC module 228 is capable of transmission/reception of RF signals through a separate RF module. The SIM module 224 is capable of including a card including a SIM and/or an embodied SIM. The SIM module 224 is also capable of containing unique identification information, e.g., integrated circuit card identifier (ICCID), or subscriber information, e.g., international mobile subscriber identity (IMSI).

As illustrated in FIG. 2, memory 230 (e.g., memory 103 shown in FIG. 1) is capable of including a built-in or internal memory 232 and/or an external memory 234. The built-in or internal memory 232 is capable of including at least one of the following: a volatile memory, e.g., a dynamic random access memory (DRAM), a static RAM (SRAM), a synchronous dynamic RAM (SDRAM), etc.; and a non-volatile memory, e.g., a one-time programmable read only memory (OTPROM), a programmable ROM (PROM), an erasable and programmable ROM (EPROM), an electrically erasable and programmable ROM (EEPROM), a mask ROM, a flash ROM, a flash memory (e.g., an NAND flash memory, an NOR flash memory, etc.), a hard drive, a solid state drive (SSD), etc.

According to various embodiments, the memory 230 may store instructions which are executable by the processor 210 to configure the processor to receive a gesture input made through the touch panel 252, detect touch coordinates corresponding to the gesture input, determine predictive coordinates corresponding to the touch coordinates, determine whether to compensate the predictive coordinates based on the movement direction of the gesture input, determine target coordinates corresponding to the predictive coordinates based on the movement speed of the gesture input, and display at least one object at the target coordinates on the display.

According to various embodiments, the memory 230 may store instructions executable by the processor 210 to configure the processor to detect touch coordinates corresponding to a gesture input on the touch panel.

According to various embodiments, the memory 230 may store instructions executable by the processor 210 to configure the processor to check the movement direction of the gesture input at first touch coordinates at a first time point and the movement direction of the gesture input at second touch coordinates at a second time point.

According to various embodiments, the memory 230 may store instructions executable by the processor 210 to configure the processor to compare the movement direction checked at the first touch coordinates and the movement direction checked at the second touch coordinates.

According to various embodiments, the memory 230 may store instructions executable by the processor 210 to configure the processor to determine, when the movement direction of the gesture input at the second touch coordinates differs from the movement direction of the gesture input at the first touch coordinates, the difference between the first touch coordinates and first predictive coordinates corresponding thereto and compensate the second predictive coordinates corresponding to the second touch coordinates for the difference.

According to various embodiments, the memory 230 may store instructions executable by the processor 210 to configure the processor to maintain, when the movement direction of the gesture input at the second touch coordinates is identical with the movement direction of the gesture input at the first touch coordinates, the second predictive coordinates corresponding to the second touch coordinates.

According to various embodiments, the memory 230 may store an instruction executable by the processor 210 to configure the processor to check movement speed of the gesture input at the detected touch coordinates.

According to various embodiments, the memory 230 may store an instruction executable by the processor 210 to configure the processor to determine, when the movement speed is equal to or greater than a predetermined value, the predictive coordinates as target coordinates.

According to various embodiments, the memory 230 store an instruction executable by the processor 210 to configure the processor to determine, when the movement speed is less than the predetermined value, target coordinates corresponding to the predictive coordinates.

The sensor module 240 includes various sensors capable of measuring/detecting a physical quantity or an operation state of the electronic device 201, and converting the measured or detected information into an electronic signal. The sensor module 240 is capable of including at least one of the following: a gesture sensor 240A, a gyro sensor 240B, an atmospheric pressure or barometer sensor 240C, a magnetic sensor 240D, an acceleration sensor 240E, a grip sensor 240F, a proximity sensor 240G, a color or RGB sensor 240H (e.g., a red, green and blue (RGB) sensor), a biometric sensor 240I, a temperature/humidity sensor 240J, an illuminance sensor 240K, and an ultraviolet (UV) sensor 240M.

Additionally or alternatively, the sensor module 240 is capable of further including on or more of the following sensors or operations (not shown): an electronic nose (E-nose) sensor, an electromyography (EMG) sensor, an electroencephalogram (EEG) sensor, an electrocardiogram (ECG) sensor, an infrared (IR) sensor, an iris sensor and/or a fingerprint sensor. The sensor module 240 is capable of further including a control circuit for controlling one or more sensors included therein.

In various embodiments of the present disclosure, the electronic device 201 is capable of including a processor, configured as part of the processor 210 or a separate component, for controlling the sensor module 240. In this case, while the processor 210 is operating in a sleep mode, the processor is capable of controlling the sensor module 240. The input device 250 is capable of including a touch panel 252, a (digital) pen sensor (digital pen or stylus) 254, a key 256, or an ultrasonic input unit or device 258. The touch panel 252 may be implemented with at least one of the following: a capacitive touch system, a resistive touch system, an infrared touch system, and an ultrasonic touch system. The touch panel 252 may further include a control circuit. The touch panel 252 may also further include a tactile layer to provide a tactile response to the user. The (digital) pen sensor 254 may be implemented with a part of the touch panel or with a separate recognition sheet. The key 256 may include a physical button, an optical key, or a keypad. The ultrasonic input unit 258 is capable of detecting ultrasonic waves, created in an input tool, through a microphone 288, and identifying data corresponding to the detected ultrasonic waves.

The display 260 (e.g., the display 106 shown in FIG. 1) is capable of including a panel 262, a hologram unit or device 264, or a projector 266. The panel 262 may include the same or similar configurations as the display 106 shown in FIG. 1. The panel 262 may be implemented to be flexible, transparent, or wearable.

The panel 262 may also be incorporated into one module together with the touch panel 252. The hologram unit 264 is capable of showing a stereoscopic image in the air by using light interference. The projector 266 is capable of displaying an image by projecting light onto a screen. The screen may be located inside or outside of the electronic device 201. According to an embodiment, the display 260 may further include a control circuit for controlling the panel 262, the hologram unit 264, or the projector 266.

The interface 270 is capable of including an HDMI 272, a USB 274, an optical interface 276, or a D-subminiature (D-sub) 278. The interface 270 may be included in the communication interface 107 shown in FIG. 1. Additionally or alternatively, the interface 270 is capable of including a mobile high-definition link (MHL) interface, an SD card/MMC interface, or an infrared data association (IrDA) standard interface.

The audio module 280, as illustrated in FIG. 2, is capable of providing bidirectional conversion between a sound and an electronic signal. At least part of the components in the audio module 280 may be included in the input/output interface 145 shown in FIG. 1. The audio module 280 is also capable of processing sound information input or output through a speaker 282, a receiver 284, earphones 286, microphone 288, etc.

The camera module 291 refers to a device capable of taking both still and moving images. According to an embodiment, the camera module 291 is capable of including one or more image sensors (e.g., a front image sensor or a rear image sensor), a lens, an image signal processor (ISP), a flash (e.g., an LED or xenon lamp), etc.

The power management module 295 is capable of managing power of the electronic device 201. According to an embodiment, the power management module 295 is capable of including a power management IC (PMIC), a charger IC, or a battery or fuel gauge. The PMIC may employ wired charging and/or wireless charging methods. Examples of the wireless charging method are magnetic resonance charging, magnetic induction charging, and electromagnetic charging.

To this end, the PIMC may further include an additional circuit for wireless charging, such as a coil loop, a resonance circuit, a rectifier, etc. The battery gauge is capable of measuring the residual capacity, charge in voltage, current, or temperature of the battery 296. The battery 296 takes the form of either a rechargeable battery or a solar battery.

The indicator 297 is capable of displaying a specific status of the electronic device 201 or a part thereof (e.g., the processor 210), e.g., a boot-up status, a message status, a charging status, etc. The motor 298 is capable of converting an electrical signal into mechanical vibrations, such as, a vibration effect, a haptic effect, etc. Although not shown, the electronic device 201 is capable of further including a processing unit (e.g., GPU) for supporting a mobile TV. The processing unit for supporting a mobile TV is capable of processing media data pursuant to standards, e.g., digital multimedia broadcasting (DMB), digital video broadcasting (DVB), or mediaFlo™, etc.

Each of the elements described in the present disclosure may be formed with one or more components, and the names of the corresponding elements may vary according to the type of the electronic device. In various embodiments, the electronic device may include at least one of the above described elements described in the present disclosure, and may exclude some of the elements or further include other additional elements. Further, some of the elements of the electronic device according to various embodiments may be coupled to form a single entity while performing the same functions as those of the corresponding elements before the coupling.

According to various embodiments, the touch input processing method of the electronic device 201 may include receiving a gesture input made through the touch panel, detecting touch coordinates corresponding to the gesture input on the touch panel, determining predictive coordinates corresponding to the touch coordinates, determining whether to compensate the predictive coordinates based on the movement direction of the gesture input, determining target coordinates corresponding to the predictive coordinates based on the movement speed of the gesture input, and displaying at least one object at the target coordinates on the display.

According to various embodiments, the touch input processing method of the electronic device 201 may include detecting the touch coordinates of the gesture input at a predetermined time interval.

According to various embodiments, the touch input processing method of the electronic device 201 may include checking the movement direction of the gesture input at first touch coordinates at a first time point and checking the movement direction of the gesture input at second coordinates at a second time point.

According to various embodiments, the touch input processing method of the electronic device 201 may include comparing the movement direction of the gesture input at the first touch coordinates and the movement direction of the gesture input at the second touch coordinates.

According to various embodiments, the touch input processing method of the electronic device 201 may include determining, when the movement direction of the gesture input at the second touch coordinates is different from the direction of the gesture input at the first touch coordinates, difference between the first touch coordinates and the first predictive coordinates corresponding thereto, and compensating the second predictive coordinates corresponding to the second touch coordinates for the difference.

According to various embodiments, the touch input processing method of the electronic device 201 may include maintaining, when the movement direction of the gesture input at the second touch coordinate is substantially identical with the direction of the gesture input at the first touch coordinates, the second predictive coordinates corresponding to the second touch coordinates.

According to various embodiments, the touch input processing method of the electronic device 201 according to various embodiments may include checking movement speed of the gesture input at the detected touch coordinates.

According to various embodiments, the touch input processing method of the electronic device may include determining, when the movement speed is equal to or greater than a predetermined value, the predictive coordinates as target coordinates.

According to various embodiments, the touch input processing method of the electronic device 201 may include determining, when the movement speed is less than the predetermined value, target coordinates corresponding to the predictive coordinates.

Figure 3:
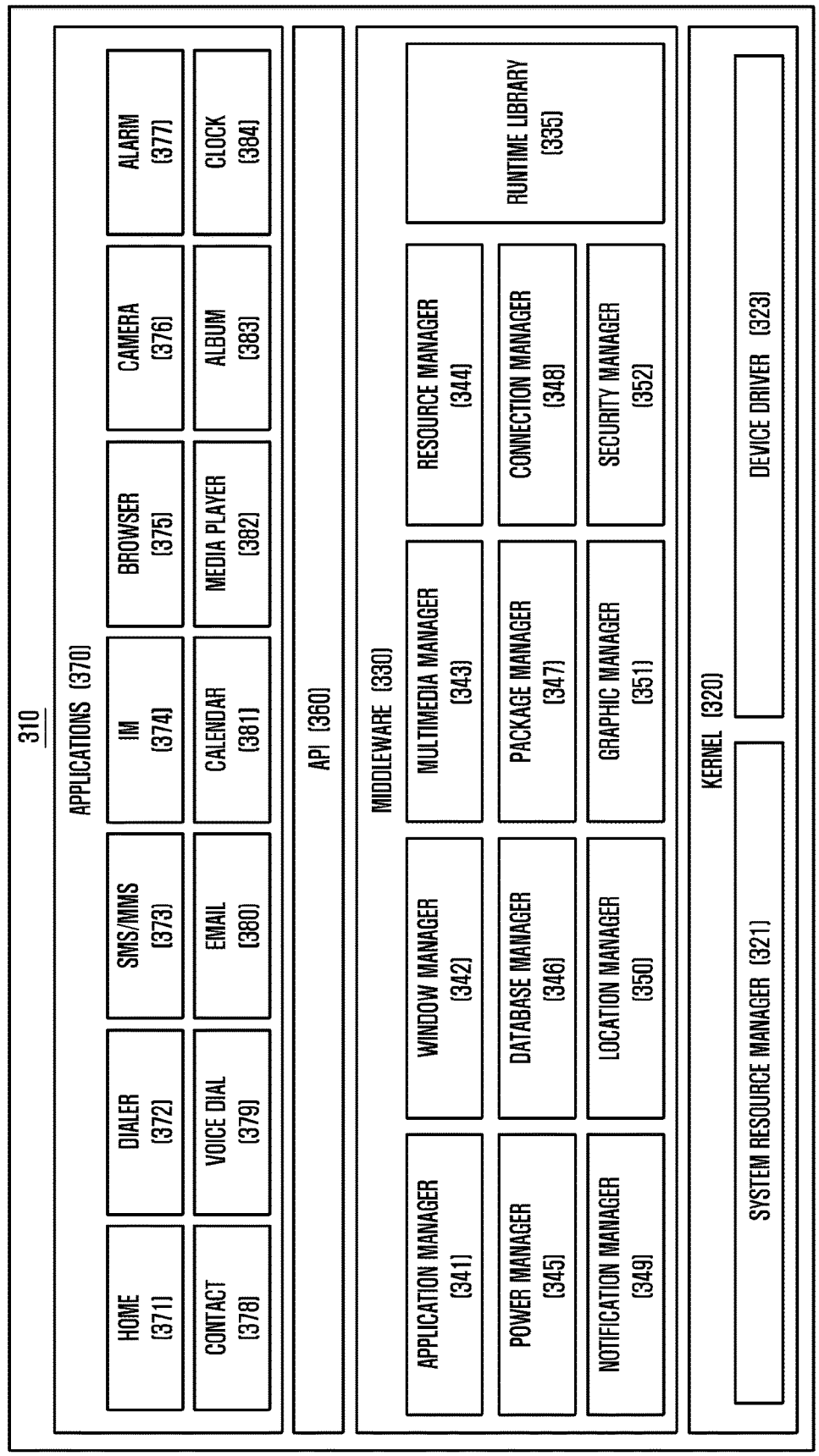
FIG. 3 is a block diagram illustrating an example configuration of the program module according to various example embodiments.

FIG. 3 is a block diagram illustrating an example configuration of a programming module 310 according to various example embodiments of the present disclosure.

The programming module 310 may be included (or stored) in the electronic device 100 (e.g., the memory 130) illustrated in FIG. 1, or may be included (or stored) in the electronic device 201 (e.g., the memory 230) illustrated in FIG. 2. At least a part of the programming module 310 may be implemented in software, firmware, hardware, or a combination of two or more thereof. The programming module 310 may be implemented in hardware (e.g., the hardware 200 of FIG. 2), and may include an operating system (OS) controlling resources related to an electronic device (e.g., the electronic device 100) and/or various applications (e.g., an application 370) executed in the OS. For example, the OS may be Android, iOS, Windows, Symbian, Tizen, Bada, and the like.

Referring to FIG. 3, the programming module 310 may include a kernel 320, a middleware 330, an API 360, and/or the application 370.

The kernel 320 (e.g., the kernel 141 in FIG. 1) may include a system resource manager 321 and/or a device driver 323. The system resource manager 321 may include, for example, a process manager (not illustrated), a memory manager (not illustrated), and a file system manager (not illustrated). The system resource manager 321 may perform the control, allocation, recovery, and/or the like of system resources. The device driver 323 may include, for example, a display driver (not illustrated), a camera driver (not illustrated), a BT driver (not illustrated), a shared memory driver (not illustrated), a USB driver (not illustrated), a keypad driver (not illustrated), a Wi-Fi driver (not illustrated), and/or an audio driver (not illustrated). Also, according to an embodiment of the present disclosure, the device driver 312 may include an inter-process communication (IPC) driver (not illustrated).

The middleware 330 may include multiple modules previously implemented so as to provide a function used in common by the applications 370. Also, the middleware 330 may provide a function to the applications 370 through the API 360 in order to enable the applications 370 to efficiently use limited system resources within the electronic device. For example, as illustrated in FIG. 3, the middleware 330 (e.g., the middleware 143) may include at least one of a runtime library 335, an application manager 341, a window manager 342, a multimedia manager 343, a resource manager 344, a power manager 345, a database manager 346, a package manager 347, a connectivity or connection manager 348, a notification manager 349, a location manager 350, a graphic manager 351, a security manager 352, and any other suitable and/or similar manager(s).

The runtime library 335 may include, for example, a library module used by a complier, in order to add a new function by using a programming language during the execution of the application(s) 370. According to an embodiment of the present disclosure, the runtime library 335 may perform functions which are related to input and output, the management of a memory, an arithmetic function, and/or the like.

The application manager 341 may manage, for example, a life cycle of at least one of the applications 370. The window manager 342 may manage graphical user interface (GUI) resources used on the screen. The multimedia manager 343 may detect a format used to reproduce various media files and may encode or decode a media file through a codec appropriate for the relevant format. The resource manager 344 may manage resources, such as a source code, a memory, a storage space, and/or the like of at least one of the applications 370.

The power manager 345, as illustrated in FIG. 3, may operate together with a basic input/output system (BIOS), may manage a battery or power, and may provide power information and the like used for an operation. The database manager 346 may manage a database in such a manner as to enable the generation, search and/or change of the database to be used by at least one of the applications 370. The package manager 347 may manage the installation and/or update of an application distributed in the form of a package file.

The connectivity or connection manager 348 may manage a wireless connectivity such as, for example, Wi-Fi and BT. The notification manager 349 may display or report, to the user, an event such as an arrival message, an appointment, a proximity alarm, and the like in such a manner as not to disturb the user. The location manager 350 may manage location information of the electronic device. The graphic manager 351 may manage a graphic effect, which is to be provided to the user, and/or a user interface related to the graphic effect. The security manager 352 may provide various security functions used for system security, user authentication, and the like. According to an embodiment of the present disclosure, when the electronic device (e.g., the electronic device 100) has a telephone function, the middleware 330 may further include a telephony manager (not illustrated) for managing a voice telephony call function and/or a video telephony call function of the electronic device.

The middleware 330 may generate and use a new middleware module through various functional combinations of the above-described internal element modules. The middleware 330 may provide modules specialized according to types of OSs in order to provide differentiated functions. Also, the middleware 330 may dynamically delete some of the existing elements, or may add new elements. Accordingly, the middleware 330 may omit some of the elements described in the various embodiments of the present disclosure, may further include other elements, or may replace the some of the elements with elements, each of which performs a similar function and has a different name.

The API 360 (e.g., the API 145) is a set of API programming functions, and may be provided with a different configuration according to an OS. In the case of Android or iOS, for example, one API set may be provided to each platform. In the case of Tizen, for example, two or more API sets may be provided to each platform.

The applications 370 (e.g., the applications 147) may include, for example, a preloaded application and/or a third party application. The applications 370 (e.g., the applications 134) may include, for example, a home application 371, a dialer application 372, a short message service (SMS)/multimedia message service (MMS) application 373, an instant message (IM) application 374, a browser application 375, a camera application 376, an alarm application 377, a contact application 378, a voice dial application 379, an electronic mail (e-mail) application 380, a calendar application 381, a media player application 382, an album application 383, a clock application 384, and any other suitable and/or similar application(s).

At least a part of the programming module 310 may be implemented by instructions stored in a non-transitory computer-readable storage medium. When the instructions are executed by one or more processors (e.g., the one or more processors 210), the one or more processors may perform functions corresponding to the instructions. The non-transitory computer-readable storage medium may be, for example, the memory 220. At least a part of the programming module 310 may be implemented (e.g., executed) by, for example, the one or more processors 210. At least a part of the programming module 310 may include, for example, a module, a program, a routine, a set of instructions, and/or a process for performing one or more functions.

Figure 4:
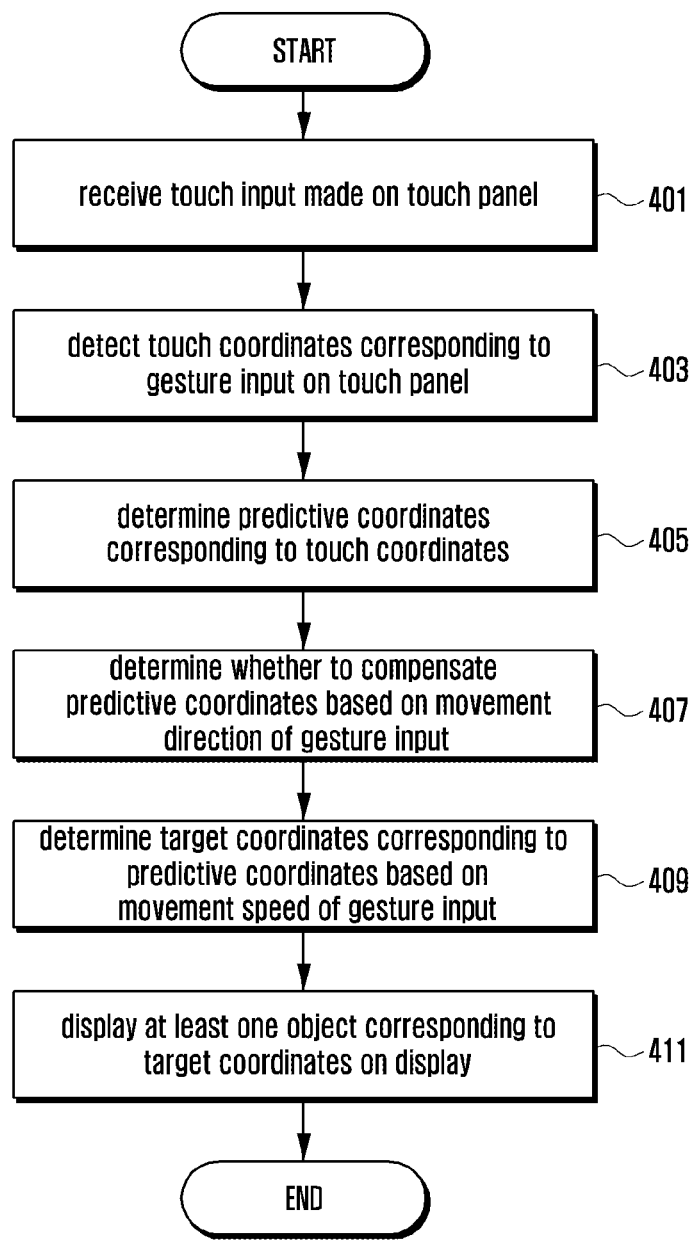
FIG. 4 is a flowchart illustrating an example procedure for an electronic device to display at least one object at target coordinates on a display according to various example embodiments.

FIG. 4 is a flowchart illustrating an example procedure for the electronic device of FIG. 2 to display at least one object at the target coordinates on a display according to various example embodiments.

The electronic device 201 may receive a gesture input (e.g., touch input) made through the touch panel at step 401.

Figure 5A:
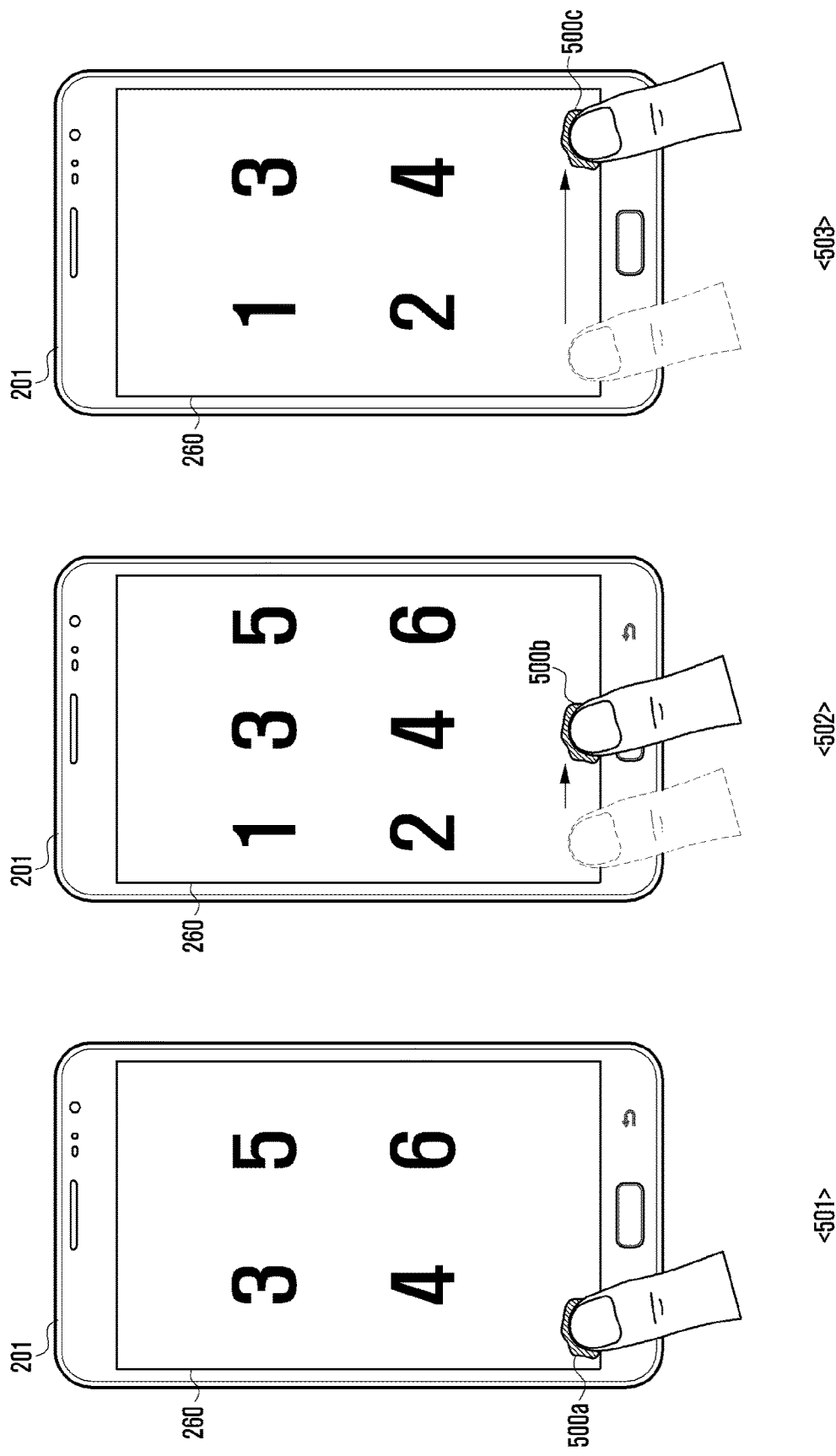
FIG. 5A is a diagram illustrating example screen displays for explaining how to detect touch coordinates of a moving gesture input on the electronic device according to various example embodiments.

The electronic device 201 may detect touch coordinates corresponding to the gesture input on the touch panel 252 of FIG. 2 at step 403. The touch coordinates consist of an x-axis coordinate and a y-axis coordinate (x, y). The electronic device 201 may process the touch coordinates as a single value in consideration of only the displacement in the scrolling direction on the display screen. For example, if it is determined that a seamless touch input is made in the horizontal direction based on the change of the touch coordinates (drag input in the horizontal direction), only the displacement on the horizontal-axis may be used for tracking the coordinates. Referring to parts 501 and 502 of FIG. 5A, if the gesture input has the first touch coordinates (100, 152) at the position 500a and the second touch coordinates (110, 152) at the position 500b, the electronic device 201 may check that only the x-axis has changed from x=100 to x=110 and determine the gesture input is made in the horizontal direction from the left to the right.

According to various embodiments, the electronic device 201 may detect the coordinates of the seamless touch input on the touch panel 252 at a predetermined time interval. Referring to parts 501 to 503, if the electronic device 201 is configured to detect the touch coordinates at an interval of 10 ms, it detects the first touch coordinates of position 500a, the second touch coordinates of position 500b, and the third touch coordinates of position 500c at a regular interval of 10 ms.

Figure 5B:
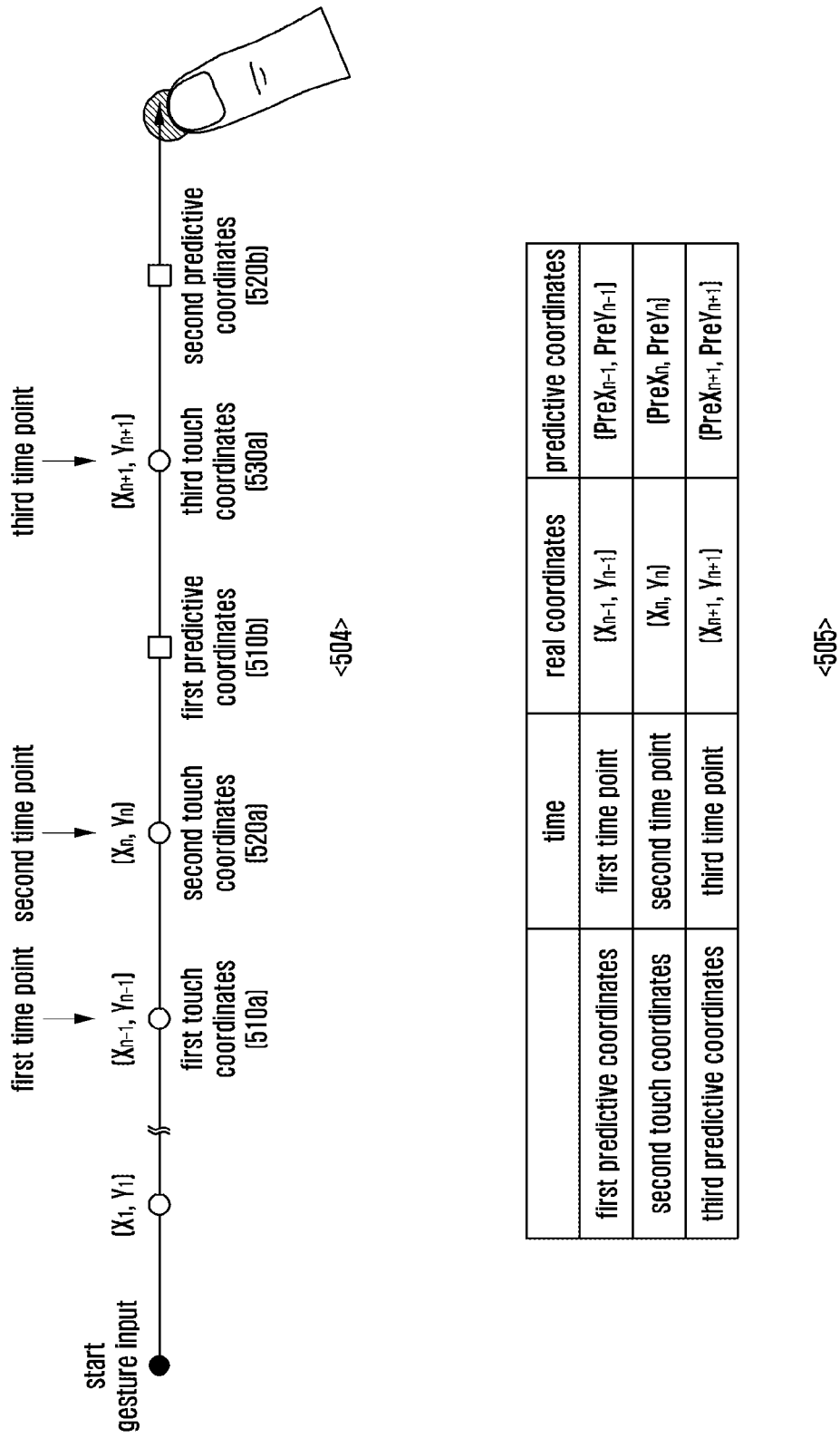
FIG. 5B is a diagram illustrating an example of how the electronic device determines predictive coordinates corresponding to detected touch coordinates according to various example embodiments.

The electronic device 201 may determine predictive coordinates corresponding to the touch coordinates at step 405. The electronic device may use at least one of the previously detected touch coordinates to determine the predictive coordinates. According to various embodiments, the electronic device 201 may add weight to the difference between the previous touch coordinates and the current touch coordinates and apply the weighted difference to the current touch coordinates or the previous predictive coordinates. Referring to part 504 of FIG. 5B, the electronic device 201 detects the first touch coordinates $(X_{n-1}, Y_{n-1})$ 510a at the first time point, the second touch coordinates $(X_n, Y_n)$ 520a at the second time point, and the third touch coordinates $(X_{n+1}, Y_{n+1})$ 530a at the third time point. The electronic device 201 may determine the first predictive coordinates 510b corresponding to the first touch coordinates 510a and the second predictive coordinates 520b corresponding to the second touch coordinates 520a. The electronic device 201 may determine the difference between the first and second touch coordinates 510a and 520a and add weight to the difference. The electronic device 201 may determine the second predictive coordinates 520b by applying the weighted difference to the second touch coordinates 520a or the first predictive coordinates 510b. The electronic device 201 may use well-known predictive coordinate determination methods without being limited to the methods described in the various embodiments.

According to various embodiments, the electronic device 201 may store the detected touch coordinates and the predictive coordinates corresponding thereto in the order of acquisition. Referring to part 505 of FIG. 5B, the electronic device 201 may store the first touch coordinates $(X_{n-1}, Y_{n-1})$ detected at the first time point and the predictive coordinates $(preX_{n-1}, preY_{n-1})$ corresponding thereto in sequence. The electronic device 201 may store the second touch coordinates $(X_n, Y_n)$ detected at the second time point and the second predictive coordinates $(preX_n, preY_n)$ corresponding thereto in sequence. The electronic device may store the third touch coordinates $(X_{n+1}, Y_{n+1})$ and the third predictive coordinates $(preX_{n+1}, preY_{n+1})$ corresponding thereto in sequence.

The electronic device 201 may determine whether to compensate the predictive coordinates based on the movement direction of the gesture input at step 407. The electronic device 201 may check the movement direction of the gesture input at the touch coordinates. For example, the electronic device 201 may check the movement direction of the gesture input at the first touch coordinates at the first time point and at the second touch coordinates at the second time point. The electronic device 201 may compare the movement direction of the gesture input at the first touch coordinates and the movement direction of the gesture input at the second touch coordinates.

According to various embodiments, if the movement directions checked at the first and second touch coordinates differ from each other, the electronic device 201 may determine the difference between the first touch coordinates and the first predictive coordinates corresponding thereto. The electronic device 201 may compensate the second predictive coordinates for the difference. The electronic device 201 may determine the target coordinates based on the compensated predictive coordinates. For example, if the movement directions checked at the first and second touch coordinates differ from each other, the electronic device 201 may determine the second predictive coordinates as the target coordinates.

According to various embodiments, if the movement directions checked at the first and second touch coordinates are identical with each other, the electronic device 201 may maintain the second predictive coordinates corresponding to the second touch coordinates. The electronic device 201 may determine the target coordinates based on the predictive coordinates. For example, if the movement directions checked at the first and second touch coordinates are identical with each other, the electronic device 201 may determine the second predictive coordinates as the target coordinates.

According to an embodiment, the electronic device 201 may determine the target coordinates corresponding to the predictive coordinates based on the movement speed of the gesture input at step 409. If the object is displayed at the predictive coordinates without canceling noise, it may be shown that the object moves discontinuously. Accordingly, it may be necessary to control the object to move quickly for close contact feeling or slowly for touch flexibility depending on the situation. The electronic device 210 may check the movement speed of the gesture input at the detected touch coordinates. If the movement speed is equal to or greater than a predetermined value, the electronic device may determine the predictive coordinates as the target coordinates without noise canceling. If the movement speed is less than the predetermined value, the electronic device 201 may determine the target coordinates corresponding to the predictive coordinates for touch flexibility. The electronic device 201 may determine the target coordinates based on at least one of the predictive coordinates. The target coordinates may be determined by averaging a predetermined number of predictive coordinates counted from the time point of the current predictive coordinates. For example, in the case of determining the first predictive coordinates corresponding to the first touch coordinates detected at the first time point, it may be possible to determine the average value of the first predictive coordinates and a predetermined number of predictive coordinates determined previously as the target coordinates corresponding to the first predictive coordinates. According to various embodiments, the electronic device 201 may use well-known predictive coordinate noise cancelling methods for determining the target coordinates corresponding to the predictive coordinates without being limited to the above-described methods. According to various embodiments, the electronic device 201 may perform step 409 independently regardless of step 407 for determining whether to compensate the predictive coordinates based on the movement direction. For example, the electronic device 201 may skip step 407 or perform step 407 after step 409.

The electronic device 201 may display at least one object at the target coordinates on the display 260 at step 411. The electronic device 201 may display an object selected by the user at the target coordinates. Examples of the object may include at least one of a display screen, an icon, and a display trajectory.

Figure 6:
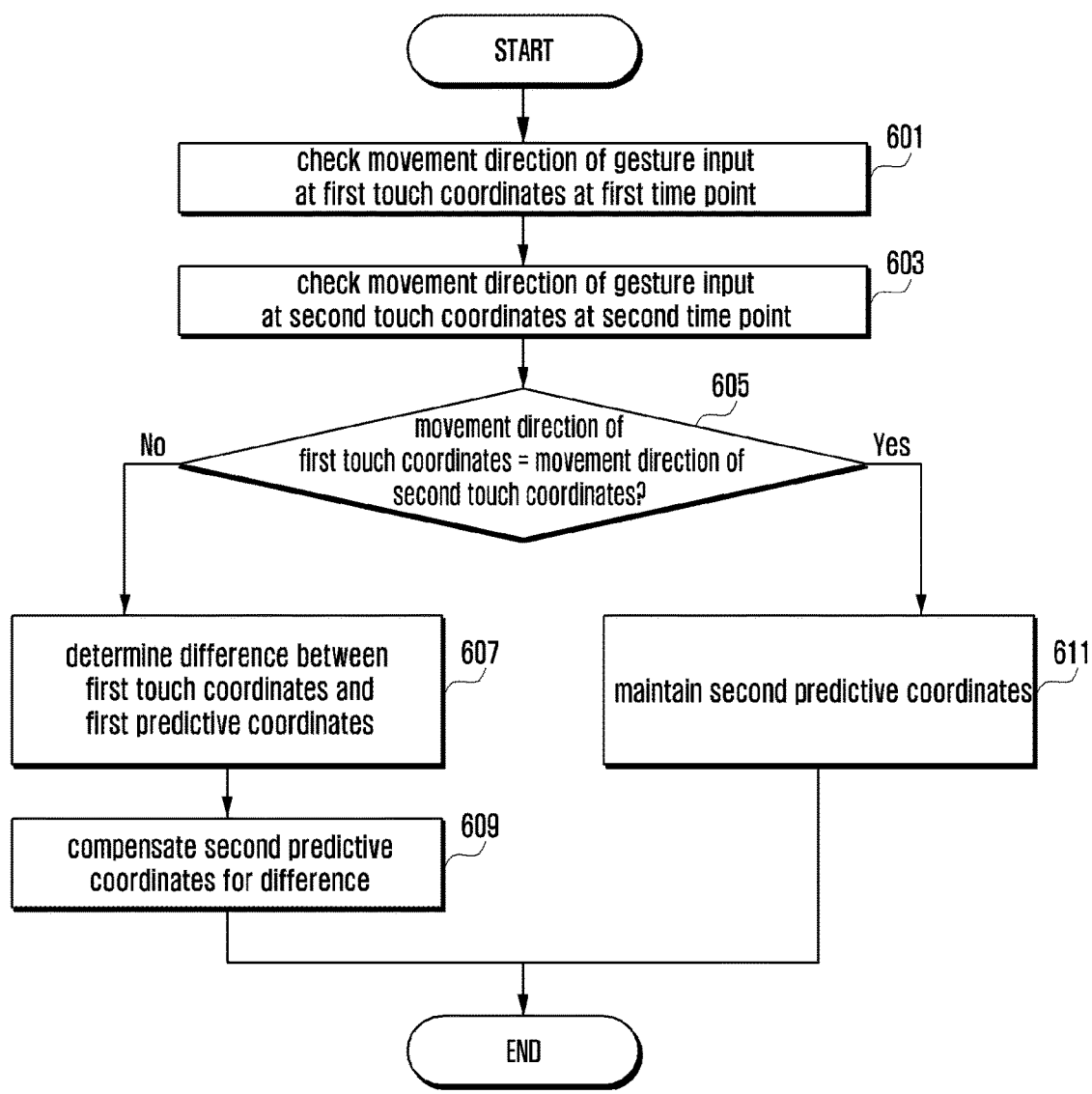
FIG. 6 is a flowchart illustrating an example procedure for the electronic device to determine whether to compensate the predictive coordinates based on the movement direction of a gesture input according to various example embodiments.

FIG. 6 is a flowchart illustrating an example procedure for the electronic device of FIG. 2 to determine whether to compensate predictive coordinates based on the movement direction of a gesture input according to various example embodiments.

Figure 7A:
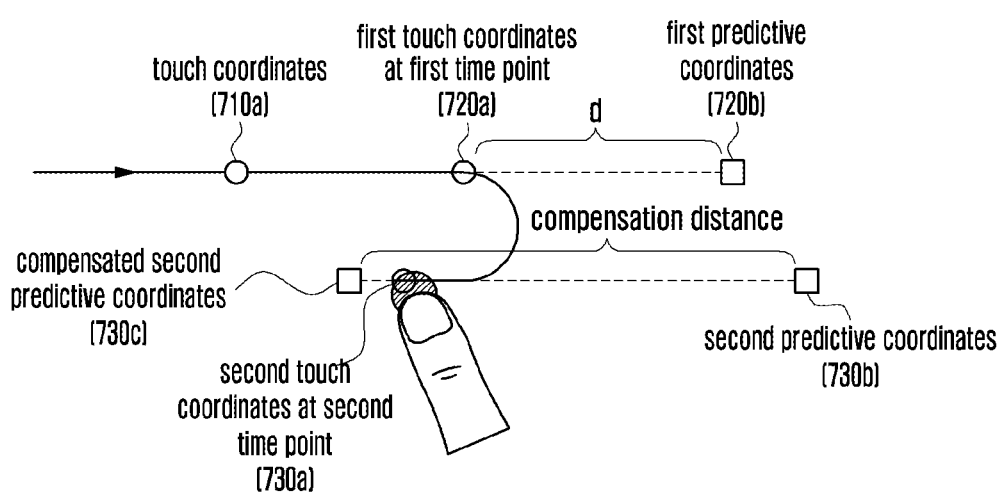
FIG. 7A is a diagram illustrating an example of how the electronic device compensates the predictive coordinates based on the gesture input made in the same direction according to various example embodiments.
Figure 7B:
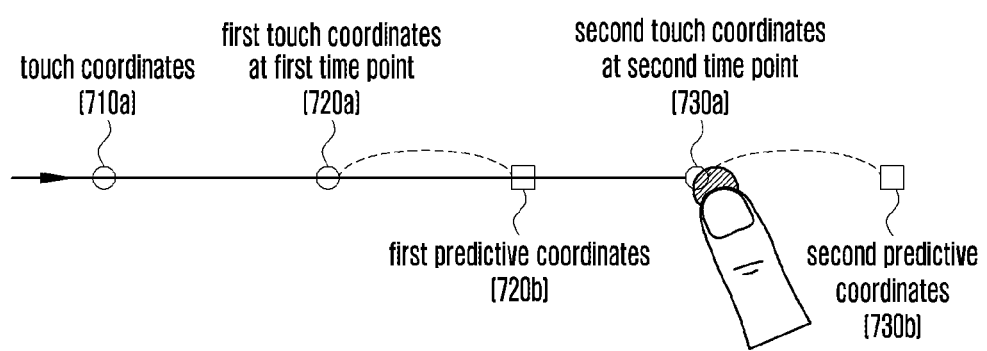
FIG. 7B is a diagram illustrating an example of how the electronic device determines predictive coordinates based on the gesture input made in a different direction according to various example embodiments.

At step 601, the electronic device 201 may check the movement direction of the gesture input at the first touch coordinates at the first time point. The electronic device 201 may check the movement direction of the gesture input using the coordinates detected at two sequential time points. Referring to FIGS. 7A and 7B, in order to check the movement direction of the gesture input at the first touch coordinates 720a at the first time point, the electronic device 201 may check the first touch coordinates 710a before the first time point and recognize that the movement direction (e.g. right horizontal direction) of the gesture input is changed at the first touch coordinates 720a located at the right side of the touch coordinates 710a. The electronic device 201 may detect the first coordinates 720a and determine the first predictive coordinates 720b corresponding to the first touch coordinates 720a.

At step 603, the electronic device may check the movement direction of the gesture input at the second touch coordinates at the second time point. Referring to FIGS. 7A and 7B, in order to check the movement direction of the gesture input at the second touch coordinates 730a at the second time point, the electronic device 201 may check the first touch coordinates 720a at the first time point before the second time point and recognize that the movement direction (e.g. left horizontal direction) of the gesture input is changed at the second touch coordinates 730a located at the left side of the first touch coordinates 720a. The electronic device 201 may detect the second touch coordinates 730a and determine the second predictive coordinates 730b corresponding thereto.

The electronic device 201 may compare the movement directions of the gesture input at the first touch coordinates and the second touch coordinates to determine whether the movement directions of the gesture input at the first and second touch coordinates are identical with or different from each other at step 605.

If the movement directions of the gesture input at the first and second touch coordinates are different from each other, the electronic device may determine the difference between the first touch coordinates and the first predictive coordinates corresponding thereto at step 607. Referring to FIGS. 7A and 7B, the electronic device 201 may determine the difference (d) between the first touch coordinates 720a and the first predictive coordinates 720b.

If the movement directions of the gesture input at the first and second touch coordinates are different from each other, the electronic device may compensate the second predictive coordinates corresponding to the second touch coordinates for the difference at step 609. Referring to FIG. 7A, the electronic device 201 may detect the first touch coordinates 720a at the first time point and the second touch coordinates 730a at the second time point. The electronic device 201 may determine the first predictive coordinates 720b corresponding to the first touch coordinates 720a and the second predictive coordinates 730b corresponding to the second touch coordinates 730a. The electronic device 201 may determine whether the movement directions of the gesture input at the first and second touch coordinates 720a and 730a are identical with each other. If the movement directions of the gesture input at the first and second touch coordinates 720a and 730a are not identical with each other, the electronic device 201 may apply a compensation distance to the second predictive coordinates 730b. According to various embodiments, if the compensation distance is applied to the second predictive coordinates 730b, the electronic device may compensate the second predictive coordinates 730b for the distance d between the first touch coordinates 720a and the first predictive coordinates 720b or a predetermined percentage of the distance d (e.g. 50% of d). According to various embodiments, if the movement directions of the gesture input at the first and second touch coordinates 720a and 730a are not identical with each other, the electronic device 201 may apply a compensation distance as much as a predetermined number of predictive coordinates. For example, if the movement directions of the gesture input at the first and second touch coordinates 720a and 730a are not identical with each other, the electronic device may compensate the second predictive coordinates 730b for 50% of d (50% of the distance between the first touch coordinates 720a and the first predictive coordinates 720b), compensate the third predictive coordinates (not shown) for 30% of d, and compensate the fourth predictive coordinates (not shown) for 20% of d. A number of predictive coordinates and compensation distances can be set in various manners without being limited to the above-described methods. The electronic device 201 may acquire the final second predictive coordinates 730c by compensating the second predictive coordinates 730b. The compensation may be expressed by an equation: (preX', preY")=(preX', preY')+[Equation (Xn, Yn, tn), (Xn−1, Yn−1, tn−1) . . . ]*(deltaX, deltaY). In the above equation, (preX', preY") denotes compensated predictive coordinates, (preX', preY') denotes the predictive coordinates before compensation, [Equation (Xn, Yn, tn), (Xn−1, Yn−1, tn−1) . . . ] denotes the compensation formula, and (deltaX, deltaY) denotes the difference between the previous touch coordinates and the previous predictive coordinates corresponding thereto. The electronic device may determine the target coordinates based on the compensated predictive coordinates. For example, if the movement directions of the gesture input at the first and second touch coordinates 720a and 730a are not identical with each other, the electronic device may determine the compensated second predictive coordinates as the target coordinates.

If the movement directions of the gesture input at the first and second touch coordinates are identical with each other, the electronic device 201 may maintain the second predictive coordinates corresponding to the second touch coordinates at step 611. Referring to FIG. 7B, the electronic device 201 may detect the first touch coordinates 720a at the first time point and the second touch coordinates 730a at the second time point. The electronic device 201 may determine the first predictive coordinates 720b corresponding to the first touch coordinates 720a and the second predictive coordinates 730b corresponding to the second touch coordinates 730a. The electronic device 201 may determine whether the movement directions of the gesture input at the first touch coordinates 720a and the second touch coordinates 730a are identical with each other. If the movement directions of the gesture input at the first touch coordinates 720a and the second touch coordinates 730a are identical with each other, the electronic device 201 may maintain the second predictive coordinates 730b corresponding to the second touch coordinates 730a. The electronic device 201 may determine the target coordinates based on the predictive coordinates. For example, if the movement directions of the gesture input at the first touch coordinates and the second touch coordinates are identical with each other, the electronic device 201 may determine the second predictive coordinates as the target coordinates.

Figure 8:
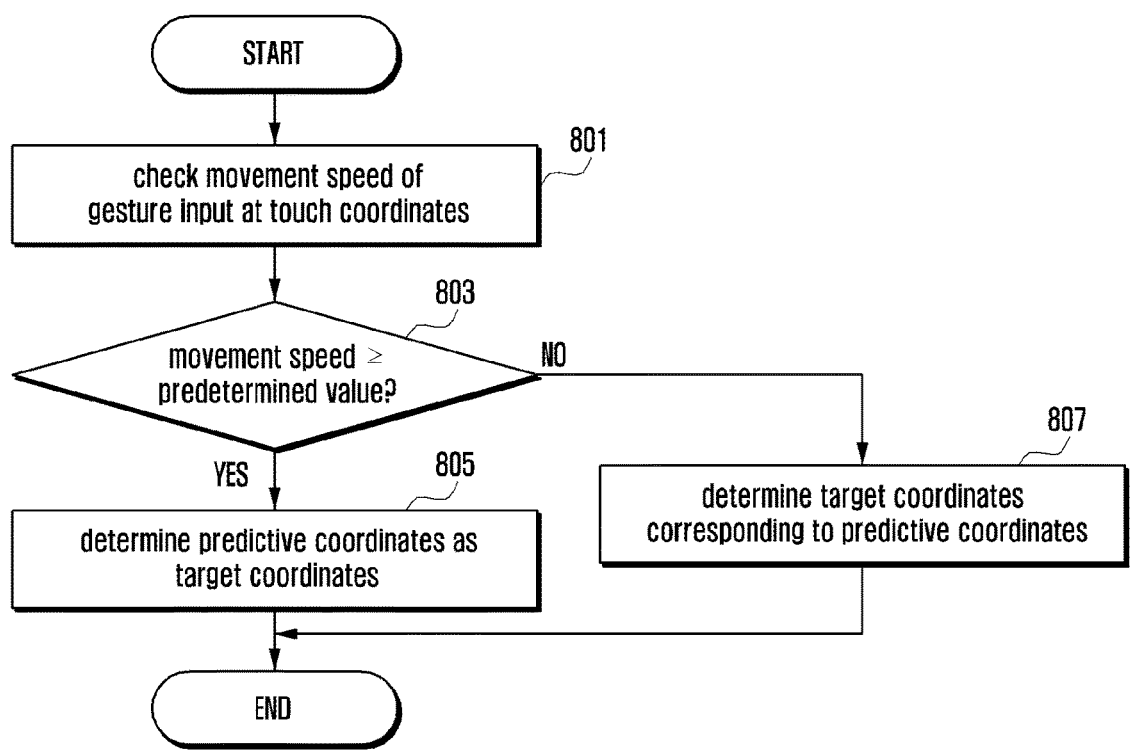
FIG. 8 is a flowchart illustrating an example procedure for an electronic device to determine target coordinates corresponding to predictive coordinates based on the movement speed of a gesture input according to various example embodiments.

FIG. 8 is a flowchart illustrating an example procedure for an electronic device to determine target coordinates corresponding to predictive coordinates based on the movement speed of a gesture input according to various example embodiments.

Figure 9:
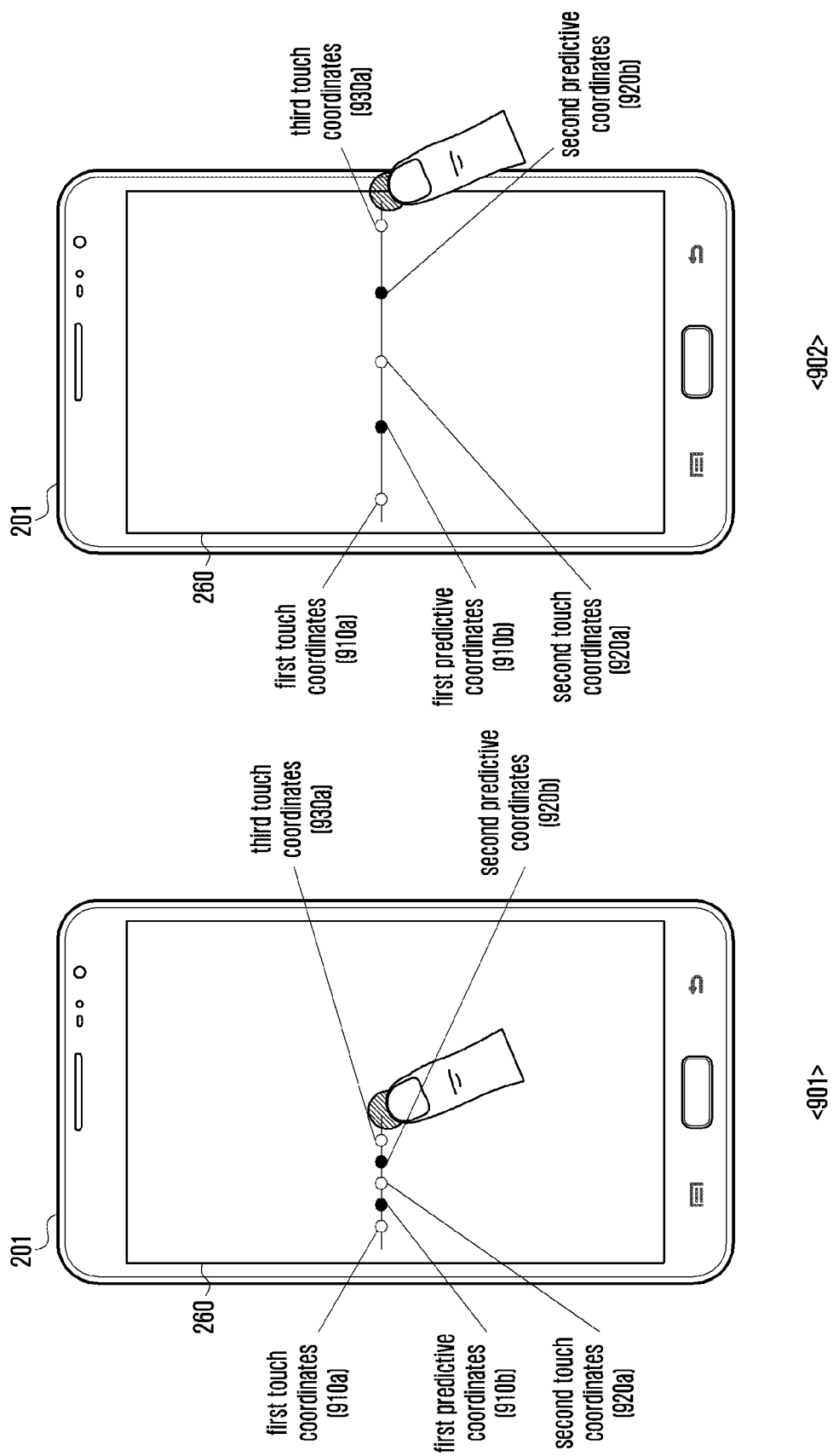
FIG. 9 is a diagram illustrating example screen displays for explaining how the electronic device determines the target coordinates based on the movement speed of the gesture input according to various example embodiments.

The electronic device 201 may check the movement speed of the gesture input at the touch coordinates at step 801. For example, the electronic device 201 may check the movement speed at the current touch coordinates using the distance between the previously detected touch coordinates and the currently detected touch coordinates. Referring to part 901 of FIG. 9, if the first and second touch coordinates 910a and 920a are detected at the first and second time points respectively, the electronic device 201 may check the movement speed of the gesture input at the second touch coordinates 920a using the distance between the first and second touch coordinates 910a and 920a and the time difference between the first and second time points.

The electronic device 201 may determine whether the movement speed of the gesture input is equal to or greater than a predetermined value at step 803.

If the movement speed of the gesture input is equal to or greater than the predetermined value, the electronic device 201 may determine the predictive coordinates as the target coordinates at step 805. This is to give weight to the close contact feeling effect rather than the smooth movement effect of the object. Referring to part 902 of FIG. 9, if the user makes the gesture input at a relatively fast speed, the electronic device may determine the predictive coordinates as the target coordinates.

If the movement speed of the gesture input is less than the predetermined value, the electronic device 201 may determine the target coordinates corresponding to the predictive coordinates at step 807. The electronic device 201 may determine the target coordinates using the current predictive coordinates and a predetermined number of previous predictive coordinates. For example, the target coordinates may be determined by averaging a predetermined number of previous predictive coordinates counted back from the current predictive coordinates. For example, if the first touch coordinates are detected at the first time point and the first predictive coordinates corresponding thereto are determined, the electronic device 201 may determine the target coordinates by averaging the first predictive coordinates and a predetermined number of previous predictive coordinates. This can be expressed by an equation: (disX, disY)=[Prediction Digital Filter Equation {(Xn, Yn, Tn), (Xn−1, Yn−1, Tn−1), . . . }]*[Noise Cancellation Digital Filter Equation {(Xn, Yn, Tn), (Xn−1, Yn−1, Tn−1) . . . }]. In this equation, (disX, disY) denotes the target coordinates, which are acquired by performing noise canceling on the predictive coordinates.

As described above, the touch input processing method for an electronic device according to various embodiments is advantageous in terms of improving a user's close contact feeling by determining the overshoot between the real touch coordinates and the predictive coordinates in consideration of the movement direction of the gesture input and compensating the next predictive coordinates for the overshoot.

Also, the touch input processing method of an electronic device according to various embodiments is advantageous in terms of improving the user's close contact feeling by canceling selectively the noise entailed in determinations of predictive coordinates in consideration of the movement speed of the gesture input.

The term "module" used in the present disclosure may refer to, for example, a unit including one or more combinations of hardware, software, and firmware. The "module" may be interchangeable with a term, such as "unit," "logic," "logical block," "component," "circuit," or the like. The "module" may be a minimum unit of a component formed as one body or a part thereof. The "module" may be a minimum unit for performing one or more functions or a part thereof. The "module" may be implemented mechanically or electronically. For example, the "module" according to an embodiment of the present disclosure may include at least one of an application-specific IC (ASIC) chip, a field-programmable gate array (FPGA), circuitry and a programmable-logic device for performing certain operations which have been known or are to be developed in the future.

Examples of computer-readable media include: magnetic media, such as hard disks, floppy disks, and magnetic tape; optical media such as compact disc ROM (CD-ROM) and DVD; magneto-optical media, such as floptical disks; and hardware devices that are specially configured to store and perform program instructions (e.g., programming modules), such as ROM, RAM, flash memory, etc. Examples of program instructions include machine code instructions created by assembly languages, such as a compiler, and code instructions created by a high-level programming language executable in computers using an interpreter, etc. The described hardware devices may be configured to act as one or more software modules in order to perform the operations and methods described above, or vice versa.

Modules or programming modules according to the example embodiments of the present disclosure may include one or more components, remove part of them described above, or include new components. The operations performed by modules, programming modules, or the other components, according to the present disclosure, may be executed in serial, parallel, repetitive or heuristic fashion. Part of the operations can be executed in any other order, skipped, or executed with additional operations.

While the present disclosure has been illustrated and described with reference to various example embodiments thereof, it will be understood by those skilled in the art that various changes in form and details may be made therein without departing from the spirit and scope of the present disclosure as defined by the appended claims and their equivalents.

What is claimed is:

1. An electronic device, comprising:
   a display having a touch panel configured to receive a touch or gesture input;
   a processor which is electrically connected to the display; and
   a memory which is electrically connected to the processor,
   wherein the memory stores instructions, executable to configure the processor to:
   receive the gesture input made through the touch panel,
   detect touch coordinates corresponding to the gesture input on the touch panel at a predetermined time interval,
   determine predictive coordinates corresponding to the touch coordinates,
   determine movement directions of the gesture input at first touch coordinates at a first time point and at second touch coordinates at a second time,
   determine whether to compensate the predictive coordinates based on the movement directions of the gesture input,
   determine, in response to determining whether to compensate the predictive coordinates, target coordinates corresponding to the predictive coordinates based on a movement speed of the gesture input such that the predictive coordinates are compensated, and
   display at least one object at the target coordinates on the display.

2. The electronic device of claim 1, wherein the instructions comprise an instruction executable to configure the processor to compare the movement directions of the gesture input at the first and second touch coordinates with each other.

3. The electronic device of claim 2, wherein the instructions comprise an instruction executable to configure the processor to determine when the movement directions of the gesture input at the first and second touch coordinates are different from each other, to determine a difference between the first touch coordinates and the first predictive coordinates corresponding to the first touch coordinates, and an instruction executable to configure the processor to compensate second predictive coordinates corresponding to the second touch coordinates.

4. The electronic device of claim 2, wherein the instructions comprise an instruction executable to configure the processor to maintain, when the movement directions of the gesture input at the first and second touch coordinates are identical with each other, second predictive coordinates corresponding to the second touch coordinates.

5. The electronic device of claim 1, wherein the instructions comprise an instruction executable to configure the processor to check the movement speed of the gesture input at the detected touch coordinates.

6. The electronic device of claim 5, wherein the instructions comprise an instruction executable to configure the processor to determine, when the movement speed is equal to or greater than a predetermined value, the predictive coordinates as the target coordinates.

7. The electronic device of claim 5, wherein the instructions comprise an instruction executable to configure the processor to determine, when the movement speed is less than a predetermined value, the target coordinates corresponding to the predictive coordinates.

8. The electronic device of claim 1, wherein the at least one object comprises at least one of a screen, an icon, and a display trajectory corresponding to the target coordinates.

9. A method of processing a touch input of an electronic device, the method comprising:
   receiving a gesture input made through a touch panel;
   detecting touch coordinates corresponding to the gesture input on the touch panel at a predetermined time interval;
   determining predictive coordinates corresponding to the touch coordinates;
   determine movement directions of the gesture input at first touch coordinates at a first time point and at second touch coordinates at a second time;
   determining whether to compensate the predictive coordinates based on the movement directions of the gesture input;
   determining, in response to determining whether to compensate the predictive coordinates, target coordinates corresponding to the predictive coordinates based on a movement speed of the gesture input such that the predictive coordinates are compensated; and
   displaying at least one object at the target coordinates on the display.

10. The method of claim 9, wherein determining whether to compensate the predictive coordinates comprises comparing the movement directions of the gesture input at the first and second touch coordinates with each other.

11. The method of claim 10, wherein determining whether to compensate the predictive coordinates comprises determining, when the movement directions of the gesture input at the first and second touch coordinates are different from each other, a difference between the first touch coordinates and the first predictive coordinates corresponding to the first touch coordinates; and
   compensating second predictive coordinates corresponding to the second touch coordinates.

12. The method of claim 10, wherein determining whether to compensate the predictive coordinates comprises maintaining, when the movement directions of the gesture input at the first and second touch coordinates are identical with each other, second predictive coordinates corresponding to the second touch coordinates.

13. The method of claim 9, wherein determining the target coordinates comprises checking the movement speed of the gesture input at the detected touch coordinates.

14. The method of claim 13, wherein determining the target coordinates comprises determining, when the movement speed is equal to or greater than a predetermined value, the predictive coordinates as the target coordinates.

15. The method of claim 13, wherein determining the target coordinates comprises determining, when the movement speed is less than a predetermined value, the target coordinates corresponding to the predictive coordinates.

16. The method of claim 9, wherein the at least one object comprises at least one of a screen, an icon, and a display trajectory corresponding to the target coordinates.

\* \* \* \* \*